United States Patent
MacPherson

[15] 3,685,161
[45] Aug. 22, 1972

[54] APPARATUS FOR TESTING FRONT WHEEL ALIGNMENT

[72] Inventor: Roger MacPherson, Rochester, N.Y.

[73] Assignee: American Tatra Inc., Rochester, N.Y.

[22] Filed: July 6, 1970

[21] Appl. No.: 52,542

[52] U.S. Cl. .............. 33/288, 33/203.13, 33/203.18, 356/154
[51] Int. Cl. ........................................... G01b 13/18
[58] Field of Search .......... 33/46 W, 46 AT, 203.18, 203.12, 33/203.13, 203.14, 203; 356/154

[56] References Cited

UNITED STATES PATENTS

| | | | |
|---|---|---|---|
| 2,410,339 | 10/1946 | Creagmile | 33/46 W |
| 3,546,782 | 12/1970 | Pereue et al. | 33/203.17 X |
| 2,292,969 | 8/1942 | Peters | 33/46 W |

FOREIGN PATENTS OR APPLICATIONS

| 91,738 | 9/1961 | Denmark | 33/46 W |
|---|---|---|---|

Primary Examiner—William D. Martin, Jr.
Attorney—Shlesinger, Fitzsimmons & Shlesinger

[57] ABSTRACT

This apparatus permits checking the front wheel alignment of automotive vehicles while the wheels are rotating. The front wheels are driven onto two rollers, and special hubcaps are mounted on the wheels, which carry optical devices that are centered by means of the centering holes, provided in manufacture, in outer ends of the steering spindles of the front axle of the vehicle. Each optical device includes a source of light and a lens system through which the light is transmitted to graduated screens mounted at the two sides of the vehicle. The readings on the screens will show whether the wheels are in alignment, and, if not, how much they are out of alignment. For testing camber, transparent graduated screens are pivotable into position between the wheels and the first-named screens, so that camber and "Toe In" can be read simultaneously.

5 Claims, 4 Drawing Figures

PATENTED AUG 22 1972 3,685,161

INVENTOR.
ROGER MAC PHERSON
BY
Shlesinger, Fitzsimmons & Shlesinger
ATTORNEYS

APPARATUS FOR TESTING FRONT WHEEL ALIGNMENT

The present invention relates to apparatus for testing the wheel alignment of the front wheels of automotive vehicles.

It is impossible to align the front wheels on an automotive vehicle perfectly unless the compression pressure on the tie rods of the vehicle is the same as when the vehicle is in motion. Heretofore, no satisfactory apparatus has been provided for effecting test of front wheel alignment while the wheels are rotating. With apparatus at present used for checking front wheel alignment, the wheels are stationary during test. Moreover, the known testing apparatus requires mirrors and is quite complicated and costly.

A primary object of the present invention is to provide apparatus for testing wheel alignment while the wheels are rotating. With this apparatus an exact reproduction of the action of the front wheels in motion is obtained because the front wheels rotate with the weight of the vehicle on them.

Another object of the invention is to provide apparatus of the character described in which any lateral run-out of the wheel and tire assembly is perfectly and automatically compensated for so that they do not affect the wheel alignment test.

Another object of the invention is to provide apparatus of the character described, which requires little or no training to operate, and which can readily be operated by any person with a high school education.

Still another object of the invention is to provide apparatus for testing wheel alignment with which wheel alignment may be checked faster than any apparatus now available for the purpose.

Still another object of the invention is to provide apparatus of the character described which will be simpler and less expensive in construction than prior apparatus for the same purpose.

Other objects of the invention will be apparent hereinafter from the specification and from the recital of the appended claims.

One embodiment of the invention is illustrated in the accompanying drawing, wherein.

Figure 1:
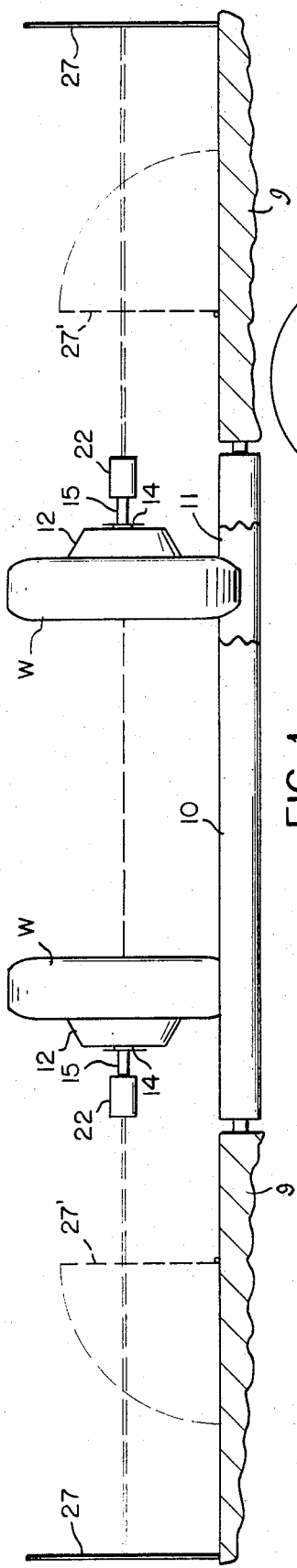
FIG. 1 is a front view, with parts broken away and shown in section, illustrating more or less diagrammatically the construction and operation of a wheel alignment checker made according to a preferred embodiment of this invention.
Figure 3:
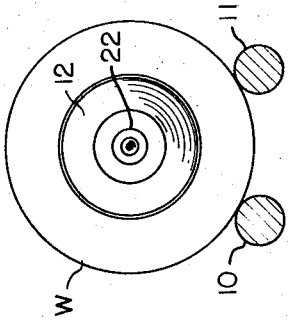
FIG. 3 is a side elevation on a considerably reduced scale as compared with FIG. 2 and showing how the wheel is mounted on rollers for the test.
Figure 4:
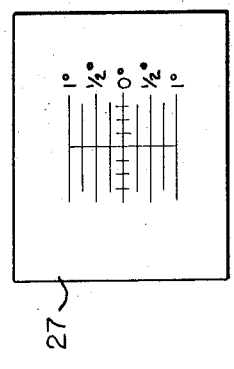
FIG. 4 is a view showing how the screens, which illustrate the wheel condition, may be graduated to permit direct reading of the wheel alignment.
Figure 2:
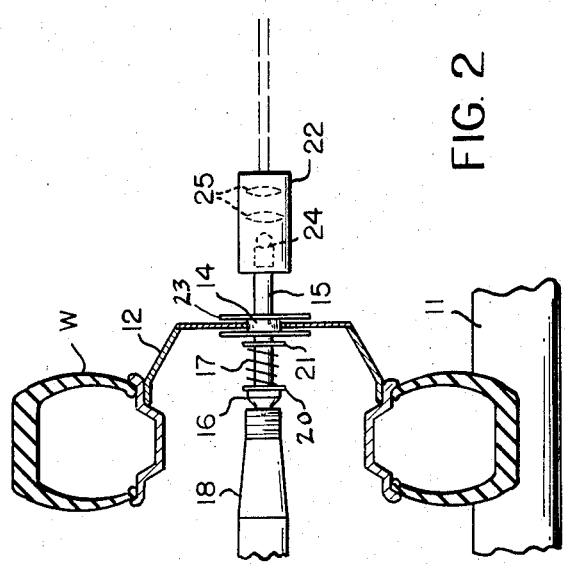
FIG. 2 is a vertical sectional view on a considerably enlarged scale showing how the light source and lens system may be mounted on the supporting spindle of one wheel of a vehicle for the purpose of checking wheel alignment.

Referring now to the drawing by numerals of reference, 9 denotes the floor of a garage or factory where the wheel alignment testing apparatus is installed. Journaled in a pit in the floor of the building, or in a frame positioned thereon, are two parallel rollers 10 and 11, on which the two front wheels W of the vehicle rest and by which the wheels are rotated during test.

For test purposes, the ordinary front hubcaps of the wheels are removed, and hubcaps 12 are substituted therefore. Each hubcap 12 has mounted centrally in it on a ball or roller bearing 14 a shaft or center 15, whose conical centering point 16 is pressed by a spring 17 into the internal conical centering hole normally provided in each steering spindle 18 of the front axle of the vehicle during manufacture for centering the spindle in a lathe, for instance. Thus, the spindle 18 extends outwardly substantially normal to the plane of the wheel, and is coaxial with the wheel. Spring 17 surrounds the centering shaft 15 and is interposed between a washer 20 that is held by the spring 17 against a shoulder on the shaft 15, and a washer 21 that is fixed to this shaft. The shaft 15 carries a holder 22 which contains a light source 24 and a focusing lens system 25. The light source may be an ordinary flashlight including bulb and battery. The light from the light source is focused by the lens system 25 onto a calibrated screen 27 which is at some distance to one side of the wheel.

There are two of the caps 12, two light sources and two sets of lenses, one for each of the two front wheels. There are also two calibrated screens provided, one for association with each of the lens systems, and one at each side of the vehicle.

Each hubcap or holder 12 for an optical shaft 15 snaps into the ring of the wheel that is used to affix the hubcap thereto. A friction slide plate 23 mounted on each optical shaft 15 allows the optical shaft to be trued to project a stationary point of light on the screen as the wheels revolve.

The screen 27 is calibrated with vertical graduations so that the center point of the graduations lies in a vertical plane midway between the revolving rollers 10 and 11.

The springs 17 serve to hold the center 16 of the optical shafts 15 in the lathe centers formed in the wheel spindles of the vehicle; and the wheel axes lie substantially in a common horizontal plane.

The two rollers 10 and 11 are parallel, and are rotated to rotate the two wheels to make the alignment test. They may be driven from a motor (not shown) or any other suitable source of power, through spur or worm gears, or belts and pulleys (not shown). In use, the front wheels of the vehicle are driven forwardly onto the rollers 10 and 11 so that the wheels are parallel except for their "toe-in" and "camber." The rollers are then driven to rotate the wheels to simulate ordinary driving conditions. If the light from the light sources falls on the zero points of the scales of the screens in the case of both wheels, the front wheels of the vehicle are properly aligned. If the rays of light from a light source do not fall on the zero mark of a screen, the wheels are out of alignment. The graduations on the screens will show the amount.

This apparatus will not only check wheel alignment while the wheels are rotating, driven by the rollers 10 and 11, but takes care of the normal position of the wheels during the check, and compensates for wheel wobble.

If it is desired to check camber as well as "Toe In," transparent screens 27' may be provided that are hinged to the floor, one at each side of the wheels, between the wheels and the associated screens 27, to be moved to vertical position as shown in dash lines in FIG. 1. These screens 27' may be graduated horizontally. The amount of camber will be shown on the horizontal graduations of the screens 27', which are reflected on the screens 27. Thus the vehicle can be tested simultaneously for "Toe In" and "Camber."

While the invention has been described in connection with a preferred embodiment thereof, then, it will be understood that it is capable of further modification, and this application is intended to cover any modifications thereof that come within the scope of the invention or the limits of the appended claims.

Having thus described my invention, what I claim is:

1. Apparatus for checking the wheel alignment of an automotive vehicle having a front axle and a pair of wheel spindles supported at opposite ends thereof and each carrying a wheel and having an internal conical centering hole in its outer end, said checking apparatus comprising rotary supporting means for revolving said wheels about their associated wheel spindles during checking, means for mounting a light source and a cooperating focusing lens on each of said wheels to revolve therewith, said mounting means including means for centering said light source and its cooperating focusing lens on each wheel coaxially of the centering hole of the associated spindle as said wheels revolve, and graduated screens spaced from said lenses and positioned to receive light therefrom for indicating the position of the beam of light from each light source as said wheels revolve.

2. Apparatus for testing front wheel alignment of an automotive vehicle comprising a pair of parallel rollers on which a front wheel of the vehicle is supported during test and which are rotatable to effect rotation of the wheel during test, a shaft rotatably supported on said wheel to be coaxial with the the wheel, means for projecting a light beam axially from said shaft, and a graduated screen positioned to receive the light beam.

3. Apparatus for testing front wheel alignment as defined in claim 2, wherein said shaft has a conical center at one end adapted to be received in an internal conical centering hole in the vehicle spindle on which the wheel is mounted, a spring surrounds said shaft to press said center into said hole, and said shaft carries at its opposite end a light source, and a lens system for concentrating the light from said source and focusing it on said screen.

4. Apparatus as claimed in claim 3, wherein a second graduated screen is movably mounted between said opposite end of said shaft, said second screen is transparent, and the first-named screen has both horizontal and vertical graduations to indicate the position of the light beam both horizontally and vertically.

5. Apparatus as claimed in claim 3, wherein both front wheels of the vehicle are supported during test on said rollers, and each wheel supports a shaft which has a conical center that is engaged in the conical centering hole in one of the wheel spindles, a spring surrounds each shaft to press its center into engagement with the hole of the associated shaft, each shaft carries at its opposite end a light source and a lends system for concentrating and focusing the light from the associated source, and there are two graduated screens positioned, respectively, at opposite sides of the vehicle to receive the beams from said light sources.

* * * * *